(12) United States Patent
Lee et al.

(10) Patent No.: US 10,505,226 B2
(45) Date of Patent: Dec. 10, 2019

(54) ELECTROLYTE FOR LITHIUM BATTERY AND LITHIUM BATTERY INCLUDING THE SAME

(71) Applicant: SAMSUNG SDI CO., LTD., Yongin-si, Gyeonggi-do (KR)

(72) Inventors: Seungtae Lee, Yongin-si (KR); Aeran Kim, Yongin-si (KR); Miyoung Son, Yongin-si (KR); Hyunbong Choi, Yongin-si (KR); Aehui Goh, Yongin-si (KR); Woocheol Shin, Yongin-si (KR); Myungheui Woo, Yongin-si (KR); Harim Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 165 days.

(21) Appl. No.: 15/430,703

(22) Filed: Feb. 13, 2017

(65) Prior Publication Data

US 2017/0237122 A1  Aug. 17, 2017

(30) Foreign Application Priority Data

Feb. 16, 2016 (KR) ........................ 10-2016-0017776

(51) Int. Cl.
*H01M 10/0567* (2010.01)
*H01M 10/0525* (2010.01)
*H01M 10/0569* (2010.01)
*H01M 4/525* (2010.01)
*H01M 4/02* (2006.01)

(52) U.S. Cl.
CPC ....... *H01M 10/0567* (2013.01); *H01M 4/525* (2013.01); *H01M 10/0525* (2013.01); *H01M 10/0569* (2013.01); *H01M 2004/028* (2013.01); *H01M 2300/0025* (2013.01)

(58) Field of Classification Search
CPC ......... H01M 10/0567; H01M 10/0569; H01M 10/0525; H01M 4/525; H01M 2004/028; H01M 2300/0025
See application file for complete search history.

(56) References Cited

U.S. PATENT DOCUMENTS

| | | | |
|---|---|---|---|
| 6,919,141 B2 | 7/2005 | Gan et al. | |
| 2010/0119956 A1 | 5/2010 | Tokuda et al. | |
| 2013/0224604 A1 | 8/2013 | Yu et al. | |
| 2014/0242453 A1* | 8/2014 | Lee ................... | H01M 10/0567 429/188 |
| 2017/0275311 A1* | 9/2017 | Kotou ............... | H01M 10/0567 |

FOREIGN PATENT DOCUMENTS

JP  2008-269979 A  11/2008
KR  10-2013-0098126 A  9/2013

OTHER PUBLICATIONS

Park, et al., Journal of Power Sources 189 (2009) 602-606.

* cited by examiner

*Primary Examiner* — Laura Weiner
(74) *Attorney, Agent, or Firm* — Lee & Morse, P.C.

(57) ABSTRACT

An electrolyte for a lithium battery and a lithium battery including the electrolyte, the electrolyte including a compound represented by Formula 1; and $LiPO_2F_2$,

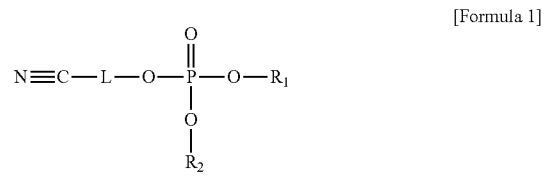

[Formula 1]

wherein, in Formula 1, $R_1$ and $R_2$ are each independently a substituted or unsubstituted C1-C10 alkyl group or $-L_1-CN$; and L and $L_1$ are each independently a substituted or unsubstituted C1-C5 alkylene group, a substituted or unsubstituted C6-C10 arylene group, or a substituted or unsubstituted C3-C20 heteroarylene group.

13 Claims, 6 Drawing Sheets

ELECTROLYTE FOR LITHIUM BATTERY AND LITHIUM BATTERY INCLUDING THE SAME

CROSS-REFERENCE TO RELATED APPLICATION

Korean Patent Application No. 10-2016-0017776, filed on Feb. 16, 2016, in the Korean Intellectual Property Office, and entitled: "Electrolyte for Lithium Battery and Lithium Battery Including the Same," is incorporated by reference herein in its entirety.

BACKGROUND

1. Field

Embodiments relate to an electrolyte for a lithium battery and a lithium battery including the electrolyte.

2. Description of the Related Art

Lithium batteries may be used as power sources for portable electronic devices, such as video cameras, mobile phones, laptop computers, and the like. Rechargeable lithium batteries, i.e., lithium secondary batteries, may have an energy density per unit weight that is three or more times greater than that of general lead storage batteries, nickel-cadmium batteries, nickel-hydrogen batteries, nickel-zinc batteries, and the like, and may be rapidly charged.

SUMMARY

Embodiments are directed to an electrolyte for a lithium battery and a lithium battery including the electrolyte.

The embodiments may be realized by providing an electrolyte for a lithium battery, the electrolyte including a compound represented by Formula 1; and $LiPO_2F_2$,

[Formula 1]

$$N\equiv C-L-O-\underset{\underset{R_2}{|}}{\overset{\overset{O}{\|}}{P}}-O-R_1$$

wherein, in Formula 1, $R_1$ and $R_2$ are each independently a substituted or unsubstituted C1-C10 alkyl group or $-L_1-CN$; and L and $L_1$ are each independently a substituted or unsubstituted C1-C5 alkylene group, a substituted or unsubstituted C6-C10 arylene group, or a substituted or unsubstituted C3-C20 heteroarylene group.

The electrolyte may further include a compound represented by Formula 2:

[Formula 2]

$$\left[\begin{array}{c}\text{structure with P center, F, and oxalate groups}\end{array}\right]^{\ominus} \text{Li}^{\oplus}.$$

The compound represented by Formula 1 may be represented by one of the following Formulae 3 to 5:

[Formula 3]

$$N\equiv C-(H_2C)_n-O-\underset{\underset{R_2}{|}}{\overset{\overset{O}{\|}}{\underset{|}{P}}}-O-(CH_2)_n-C\equiv N$$

wherein, in Formula 3, n may be an integer of 1 to 5; and $R_2$ may be a methyl group, an ethyl group, a propyl group, a butyl group, or a pentyl group,

[Formula 4]

$$N\equiv C-(H_2C)_n-O-\underset{\underset{\underset{\underset{N}{|||}}{\underset{C}{|}}}{\underset{(CH_2)_n}{|}}}{\overset{\overset{O}{\|}}{\underset{|}{P}}}-O-(CH_2)_n-C\equiv N$$

wherein, in Formula 4, n may be an integer of 1 to 5, and

[Formula 5]

$$N\equiv C-(H_2C)_n-O-\underset{\underset{R_2}{|}}{\overset{\overset{O}{\|}}{\underset{|}{P}}}-O-R_1$$

wherein, in Formula 5, n may be an integer of 1 to 5; and $R_1$ and $R_2$ may each independently be a methyl group, an ethyl group, a propyl group, a butyl group, or a pentyl group.

The compound represented by Formula 1 may be represented by one of the following Formulae 6 to 11:

[Formula 6]

[structure of tris(cyanomethyl/ethyl) phosphate type compound]

[Formula 7]

[structure of tris(2-cyanoethyl) phosphate]

[Formula 8]

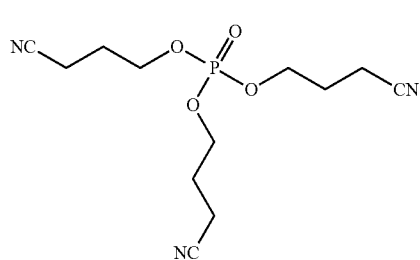

[Formula 9]

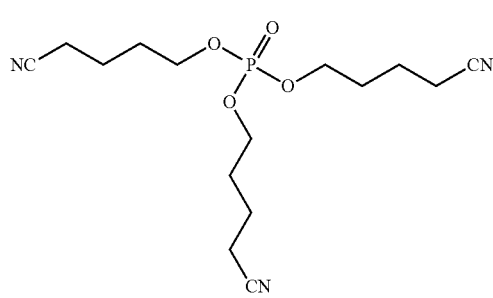

[Formula 10]

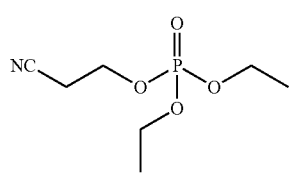

[Formula 11]

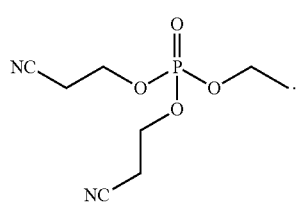

The compound represented by Formula 1 may be included in the electrolyte in an amount of about 0.1 wt % to about 10 wt %, based on a total weight of the electrolyte.

The embodiments may be realized by providing a lithium battery including a positive electrode; a negative electrode; and an electrolyte, the electrolyte including a compound represented by Formula 1 and $LiPO_2F_2$,

[Formula 1]

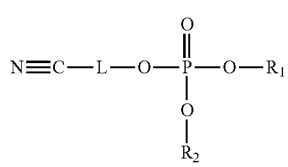

wherein, in Formula 1, $R_1$ and $R_2$ are each independently a substituted or unsubstituted C1-C10 alkyl group or $-L_1-CN$; and L and $L_1$ are each independently a substituted or unsubstituted C1-05 alkylene group, a substituted or unsubstituted C6-C10 arylene group, or a substituted or unsubstituted C3-C20 heteroarylene group.

The positive electrode may include a lithium-nickel composite compound.

The lithium-nickel composite compound may be represented by Formula 12:

 <Formula 12> wherein, in Formula 12, x may be from about 0.9 to about 1.2; y may be from about 0.5 to about 1.0; and M may be cobalt (Co), manganese (Mn), or aluminum (Al).

The compound represented by Formula 12 may be represented by the following Formula 13 or Formula 14:

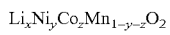 [Formula 13]

wherein, in Formula 13, $1 \leq x \leq 1.2$, $0.5 \leq y < 1$, $0 \leq z \leq 0.5$, and $0 \leq 1-y-z \leq 0.5$; and

 [Formula 14]

wherein, in Formula 14, $1 \leq x \leq 1.2$, $0.5 \leq y \leq 1$, and $0 \leq z \leq 0.5$.

The compound represented by Formula 12 may be $LiNi_{0.6}Co_{0.2}Mn_{0.2}O_2$ or $LiNi_{0.88}Co_{0.1}Al_{0.02}O_2$.

The electrolyte may include an organic solvent; and the organic solvent may include a linear or cyclic carbonate, a linear or cyclic ester, a linear or cyclic amide, an aliphatic nitrile, a linear or cyclic ether, or a derivative thereof.

The electrolyte may further include a lithium salt.

The electrolyte may further include a compound represented by Formula 2:

[Formula 2]

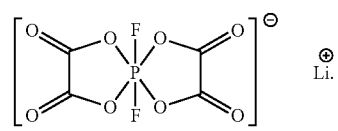

The compound represented by Formula 1 may be represented by one of the following Formulae 3 to 5:

[Formula 3]

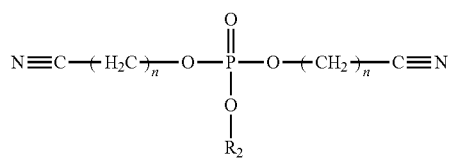

wherein, in Formula 3, n may be an integer of 1 to 5; and $R_2$ may be a methyl group, an ethyl group, a propyl group, a butyl group, or a pentyl group,

[Formula 4]

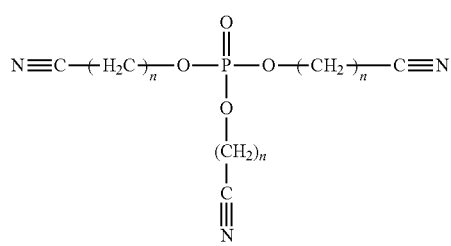

wherein, in Formula 4, n is an integer of 1 to 5, and

[Formula 5]

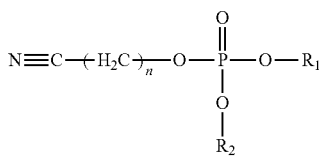

wherein, in Formula 5, n may be an integer of 1 to 5; and $R_1$ and $R_2$ may each independently be a methyl group, an ethyl group, a propyl group, a butyl group, or a pentyl group.

The compound represented by Formula 1 may be represented by one of the following Formulae 6 to 11:

[Formula 6]

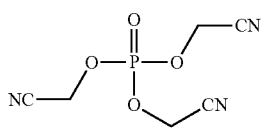

[Formula 7]

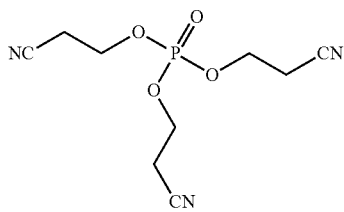

[Formula 8]

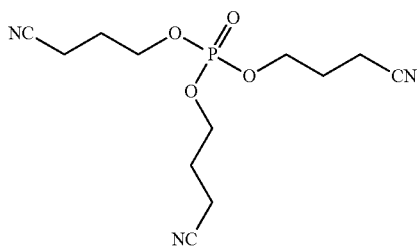

[Formula 9]

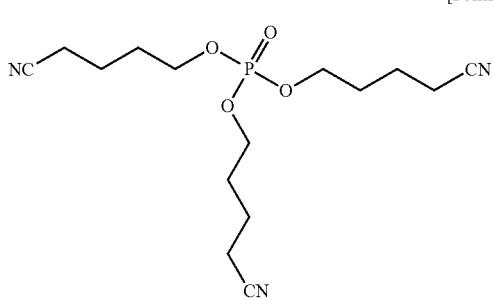

[Formula 10]

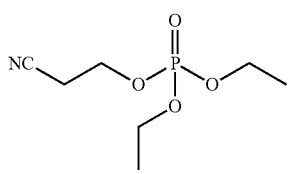

[Formula 11]

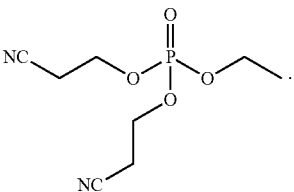

The compound represented by Formula 1 may be included in the electrolyte in an amount of about 0.1 wt % to about 10 wt %, based on a total weight of the electrolyte.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
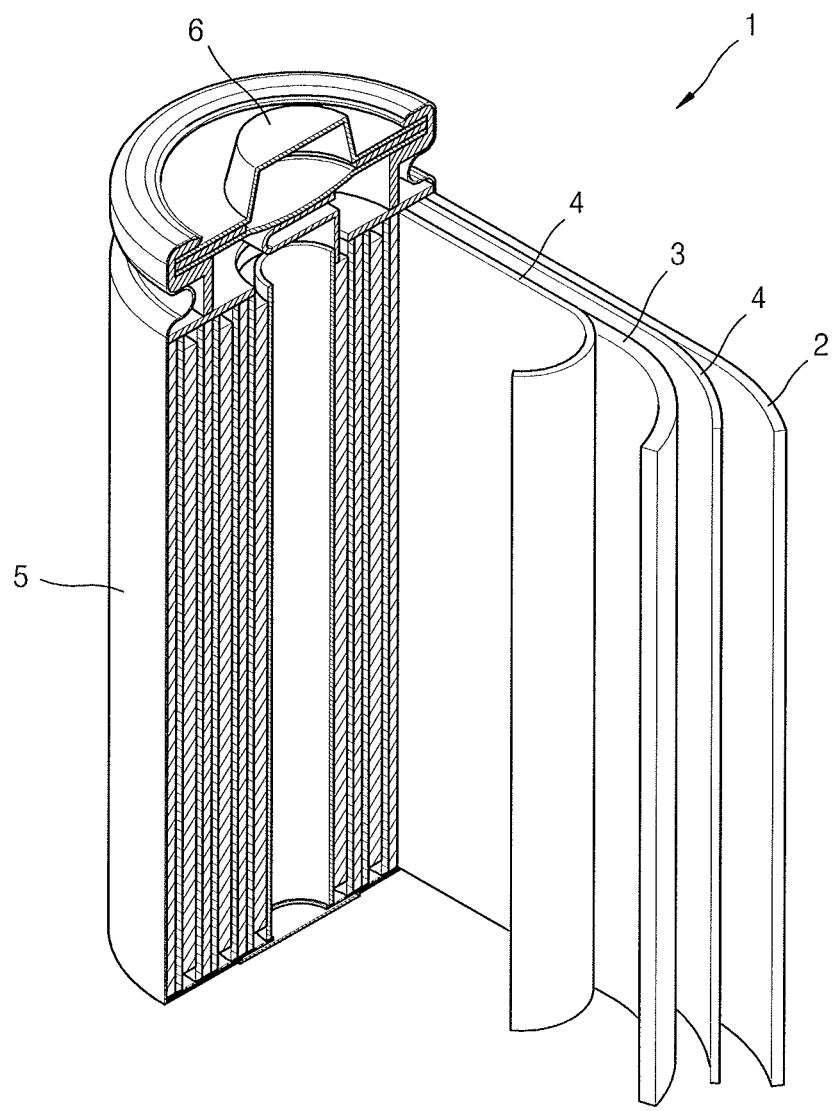
FIG. 1 illustrates a diagram of a lithium battery according to an example embodiment.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present.

Reference will now be made in detail to embodiments of an electrolyte for a lithium battery, and a lithium battery including an electrolyte according to any of the embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. The term "or" is not an exclusive term in that "A or B" would include any combination of A, B, or A and B.

According to an aspect of the present disclosure, an electrolyte for a lithium battery may include, e.g., a compound represented by Formula 1 and $LiPO_2F_2$.

[Formula 1]

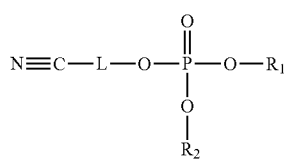

In Formula 1, $R_1$ and $R_2$ may each independently be or include, e.g., a substituted or unsubstituted C1-C10 alkyl group or $-L_1$-CN; and L and $L_1$ may each independently be or include, e.g., a substituted or unsubstituted C1-05 alkylene group, a substituted or unsubstituted C6-C10 arylene group, or a substituted or unsubstituted C3-C20 heteroaryl group.

A substituent group of the alkyl group, alkylene group, arylene group, and heteroarylene group in Formula 1 may be, e.g., a halogen atom, a C1-C20 alkyl group substituted with a halogen atom (e.g., $CCF_3$, $CHCF_2$, $CH_2F$, $CCl_3$, or the like), a C1-C20 alkoxy group, a C2-C20 alkoxy alkyl group, a hydroxyl group, a nitro group, a cyano group, an amino group, an amidino group, hydrazine, hydrazone, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 hetero alkyl group, a C6-C20 aryl group, a C6-C20 aryl alkyl group, a C6-C20 heteroaryl group, a C7-C20 heteroaryl alkyl group, a C6-C20 heteroaryloxy group, a C6-C20 heteroaryl oxyalkyl group, or a C6-C20 heteroaryl alkyl group.

The $LiPO_2F_2$ in the electrolyte may help implement low resistance characteristics of the electrolyte.

The compound of Formula 1 has a phosphate backbone structure that may help suppress decomposition of a solvent as well as $LiPF_6$ (as a lithium salt in the electrolyte) and may help improve high-temperature stability of the electrolyte. A cyano group at a terminal end of the compound of Formula 1 may coordinate to a positive electrode and may help suppress release of metal of a positive active material and generation of gas by oxidation decomposition. Thus, due to the compound of Formula 1, the electrolyte including the compound of Formula 1 may exhibit improved lifetime characteristics at room (e.g., ambient) temperature and high temperature.

In an implementation, the electrolyte may further include a compound represented by Formula 2. When an electrolyte according to any of the embodiments further includes the compound represented by Formula 2, a lithium battery including the electrolyte may have improved output characteristics and further improved lifetime characteristics.

[Formula 2]

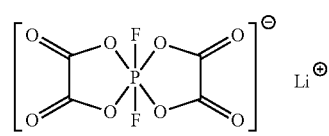

In an implementation, the compound represented by Formula 1 may be represented by one of the following Formulae 3 to 5.

[Formula 3]

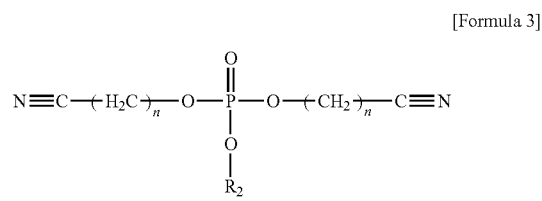

In Formula 3, n may be an integer of, e.g., 1 to 5; and $R_2$ may be, e.g., a methyl group, an ethyl group, a propyl group, a butyl group, or a pentyl group.

[Formula 4]

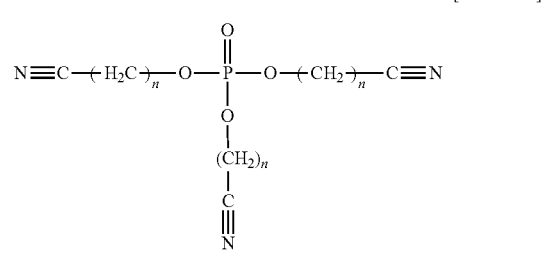

In Formula 4, n may be an integer of, e.g., 1 to 5.

[Formula 5]

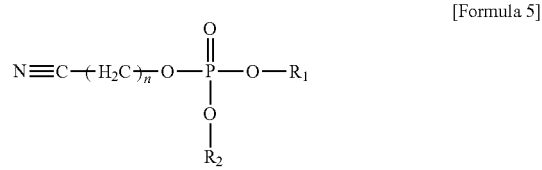

In Formula 5, n may be an integer of, e.g., 1 to 5; and $R_1$ and $R_2$ may each independently be, e.g., a methyl group, an ethyl group, a propyl group, a butyl group, or a pentyl group.

In Formulae 3 to 5, n may be an integer of, e.g., 1 to 3.

In an implementation, the compound of Formula 4 having three cyano groups may form more coordinate bonds to the positive electrode, and thus may more effectively stabilize the positive electrode, compared with the compound of Formula 3 or 5 having one or two cyano groups.

In an implementation, the compound represented by Formula 1 may be one of the following Compounds 6 to 11.

[Compound 6]

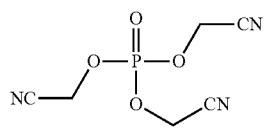

[Compound 7]

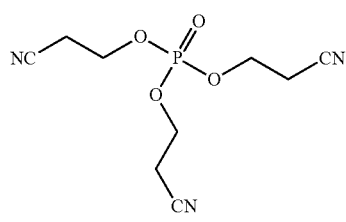

[Compound 8]

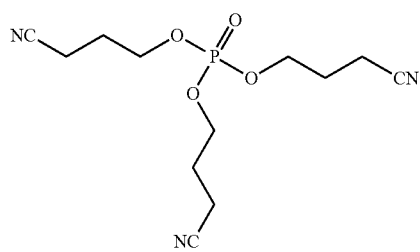

[Compound 9]

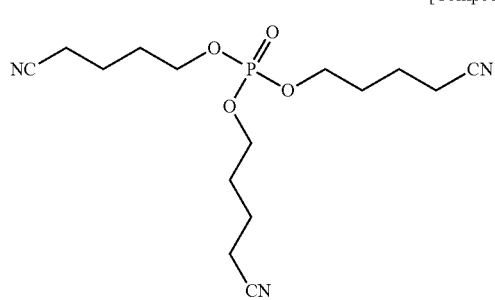

[Compound 10]

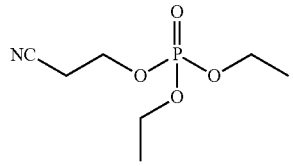

[Compound 11]

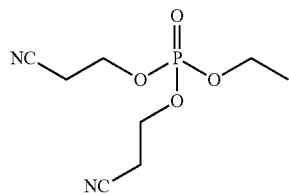

In an implementation, the compound of Formula 1 may be included in the electrolyte in an amount of, e.g., about 0.1 wt % to about 10 wt %, about 0.1 wt % to about 7 wt %, or about 0.1 wt % to about 2.0 wt %, based on a total weight of the electrolyte. When the amount of the compound of Formula 1 is within these ranges, a lithium battery including the electrolyte may have improved output characteristics and lifetime characteristics.

In an implementation, the compound represented by Formula 2 may be included in the electrolyte in an amount of, e.g., about 0.1 wt % to about 10 wt %, about 0.1 wt % to about 7 wt %, or about 0.1 wt % to about 2.0 wt %, based on the total weight of the electrolyte. When the amount of the compound represented by Formula 2 is within these ranges, a lithium battery including the electrolyte may have improved resistance characteristics.

In an implementation, the $LiPO_2F_2$ may be included in the electrolyte in an amount of, e.g., about 0.1 wt % to about 10 wt %, about 0.1 wt % to about 7 wt %, or about 0.1 wt % to about 2.0 wt %, based on the total weight of the electrolyte. When the amount of $LiPO_2F_2$ is within these ranges, a lithium battery including the electrolyte may have improved resistance characteristics.

In an implementation, the electrolyte may have improved lifetime characteristics at room temperature and high temperature at a high operation voltage of about 4.25 V or greater.

An electrolyte according to an embodiment may include, e.g., a mixture of the compound represented by Formula 1, $LiPO_2F_2$, and the compound represented by Formula 2, wherein the amount of $LiPO_2F_2$ may be about 0.1 part to about 5 parts by weight based on 100 parts by weight of the compound represented by Formula 1, and the amount of the compound represented by Formula 2 may be from about 0.1 part to about 5 parts by weight based on 100 parts by weight of the compound represented by Formula 1. When a mixing ratio of the compound represented by Formula 1, $LiPO_2F_2$, and the compound represented by Formula 2 is within these ranges, a lithium battery including the electrolyte may have improved lifetime characteristics at room temperature and high temperature at a high voltage.

According to another aspect of the present disclosure, a lithium battery may include, e.g., a positive electrode; a negative electrode, and an electrolyte according to any of the above-described embodiments.

In an implementation, the positive electrode of the lithium battery may include a lithium-nickel composite compound including about 50 mole % to about 100 mole % (e.g., less than 100 mole %) of nickel. In an implementation, the lithium-nickel composite compound including about 50 mole % to about 100 mole % of nickel may be a compound represented by Formula 12.

$$Li_xNi_yM_{1-y}O_2 \qquad \text{[Formula 12]}$$

In Formula 12, x may be, e.g., about 0.9 to about 1.2; y may be, e.g., about 0.5 to about 1.0; and M may be, e.g., cobalt (Co), manganese (Mn), or aluminum (Al).

In an implementation, the compound of Formula 12 may be, e.g., a compound represented by Formula 13 or a compound represented by Formula 14.

$$Li_xNi_yCo_zMn_{1-y-z}O_2 \qquad \text{[Formula 13]}$$

In Formula 13, 1≤x≤1.2, 0.5≤y<1, 0≤z≤0.5, and 0≤1-y-z≤0.5.

$$Li_xNi_yCo_zAl_{1-y-z}O_2 \qquad \text{[Formula 14]}$$

In Formula 14, 1≤x≤1.2, 0.5≤y≤1, and 0≤z≤0.5.

In an implementation, the compound of Formula 12 may be, e.g., $LiNi_{0.6}Co_{0.2}Mn_{0.2}O_2$ or $LiNi_{0.88}Co_{0.1}Al_{0.02}O_2$.

In an implementation, the positive electrode of the lithium battery may include a nickel-rich lithium-nickel composite oxide including, e.g., about 50 mole % to about 100 mole % of nickel, or about 80 mole % to about 100 mole % of nickel. When the nickel content is within these ranges, the lithium battery may have improved output and improved capacity. When the nickel content is as high as within these ranges, release of transition metal from the nickel-rich lithium-nickel composite oxide could be severe, and consequentially could deteriorate high-temperature characteristics. However, the deposition of transition metal from the positive electrode may be prevented by using the electrolyte according to any of the above-described embodiments. The electrolyte according to any of the embodiments may provide an effect as if a polymer thin film is formed on the positive electrode, and thus may help prevent damage to the positive electrolyte that could otherwise be caused by byproducts from side reaction. Using an electrolyte according to any of the embodiments as described above may help prevent deterioration of high-temperature characteristics as described above, so that a high output, high-capacity lithium battery having improved lifetime at high temperature with an effect of resistance increase suppression may be manufactured. When the nickel content of the positive electrolyte is within the above-described ranges, the lithium battery may exhibit improved lifetime and suppressed increase in resistance at high temperature.

When such a nickel-rich lithium-nickel composite oxide as described above and an electrolyte according to any of the above-described embodiments are used together, a lithium battery may have further improved lifetime and suppressed increase in resistance at high temperature. In an implementation, the nickel-rich lithium-nickel composite oxide may be a compound represented by Formula 15.

$$Li_xNi_yM_{1-y}O_2 \quad [\text{Formula 15}]$$

In Formula 15, x may be, e.g., about 0.9 to about 1.2; y may be, e.g., about 0.5 to about 1.0; M may be, e.g., cobalt (Co), manganese (Mn), or aluminum (Al).

In an implementation, the compound of Formula 15 may be, e.g., a compound represented by Formula 16 or a compound represented by Formula 17.

$$Li_xNi_yCo_zMn_{1-y-z}O_2 \quad [\text{Formula 16}]$$

In Formula 16, $1 \leq x \leq 1.2$, $0.5 \leq y < 1$, and $0 \leq z \leq 0.5$, wherein 1-y-z may be from about 0 to about 0.5.

$$Li_xNi_yCo_zAl_{1-y-z}O_2 \quad [\text{Formula 17}]$$

In Formula 17, $0.5 \leq y \leq 1.0$, and $0 \leq z \leq 0.5$.

In an implementation, the compound of Formula 17 may be $LiNi_{0.6}Co_{0.2}Mn_{0.2}O_2$, or $LiNi_{0.88}Co_{0.1}Al_{0.02}O_2$.

In an implementation, the organic solvent of the electrolyte may include a low-boiling point solvent. The low-boiling point solvent may refer to a solvent having a boiling point of about 200° C. at 1 atm.

In an implementation, the organic solvent may include, e.g., a linear or cyclic carbonate (e.g., a dialkyl carbonate or an alkylene carbonate), a linear or cyclic ester, a linear or cyclic amide, an aliphatic nitrile, or a linear or cyclic ether.

In an implementation, the organic solvent may include, e.g., dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), butylene carbonate, ethyl propionate, ethyl butyrate, acetonitrile, succinonitrile (SN), dimethyl sulfoxide, dimethylformamide, dimethylacetamide, γ-valerolactone, γ-butyrolactone, or tetrahydrofuran. In an implementation, a suitable low-boiling point solvent may be used.

In an implementation, the concentration of the lithium salt in the electrolyte may be, e.g., about 0.01 to about 2.0 M. In an implementation, the lithium salt may be used at a suitable concentration. When the concentration of the lithium salt is within this range, a lithium battery with further improved battery characteristics may be obtained.

In an implementation, the lithium salt in the electrolyte may include a suitable lithium salt. In an implementation, the lithium salt may include, e.g., $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may be each independently from 1 to 20), LiCl, LiI, or a mixture thereof. In an implementation, the lithium salt of the electrolyte may be, e.g., $LiPF_6$.

In an implementation, the electrolyte may be in a liquid or gel state.

Types of the lithium battery may include, e.g., lithium secondary batteries, such as a lithium ion battery, a lithium ion polymer battery, and a lithium sulfur battery, and lithium primary batteries.

In an implementation, the lithium battery may use graphite as a negative active material. In an implementation, the lithium battery may operate at a high voltage of about 4.5V or greater, e.g., about 4.8V or greater.

A lithium battery according to any of the above-described embodiments may be manufactured in the following example manner.

First, a positive electrode may be prepared.

For example, a positive active material, a conducting agent, a binder, and a solvent may be mixed together to prepare a positive active material composition. The positive active material composition may be directly coated on a metallic current collector to prepare a positive electrode. In an implementation, the positive active material composition may be cast on a separate support to form a positive active material film. The positive active material film may then be separated from the support and laminated on a metallic current collector, to thereby prepare a positive electrode. In an implementation, the positive electrode may be any of a variety of suitable types.

In some embodiments, as the positive active material, a nickel-rich lithium-nickel composite oxide as described above and a suitable lithium-containing metal oxide may be used together. For example, the lithium-containing metal oxide may include at least one of a composite oxide of lithium with a metal selected from cobalt, manganese, nickel, and a combination thereof. In an implementation, the lithium-containing metal oxide may be a compound represented by one of the following formulae: $Li_aA_{1-b}B_bD_2$ (wherein $0.90 \leq a \leq 1.8$, and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above formulae, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

In an implementation, the positive active material may be, e.g., $LiCoO_2$, $LiMn_xO_{2x}$ (wherein x=1 or 2), $LiNi_{1-x}Mn_xO_{2x}$ (wherein $0<x<1$), $LiNi_{1-x-y}Co_xMn_yO_2$ (wherein $0 \leq x \leq 0.5$, $0 \leq y \leq 0.5$, and $1-x-y>0.5$), or $LiFePO_4$.

The compounds listed above as positive active materials may have a surface coating layer (hereinafter, also referred to as "coating layer"). Alternatively, a mixture of a compound without a coating layer and a compound having a coating layer, the compounds being selected from the compounds listed above, may be used. In an implementation, the coating layer may include at least one compound of a coating element, e.g., an oxide, a hydroxide, an oxyhydroxide, an oxycarbonate, or a hydroxycarbonate of the coating element. In an implementation, the compounds for forming the coating layer may be amorphous or crystalline. In an implementation, the coating element for forming the coating layer may include, e.g., magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In an implementation, the coating layer may be formed using a suitable method that does not adversely affect the physical characteristics of the positive active material when a compound of the coating element is used. For example, the coating layer may be formed using spray coating or dipping.

In an implementation, the conducting agent may include, e.g., carbon black or graphite particulates. In an implementation, a suitable material available as a conducting agent may be used.

In an implementation, the binder may include, e.g., a vinylidene fluoride/hexafluoropropylene copolymer, polyvinylidene fluoride (PVDF), polyacrylonitrile, polymethylmethacrylate, polytetrafluoroethylene or a mixture thereof, or a styrene butadiene rubber polymer. In an implementation, a suitable material available as a binding agent may be used.

In an implementation, the solvent may include, e.g., N-methyl-pyrrolidone, acetone, or water. In an implementation, a suitable material available as a solvent may be used.

In an implementation, the amounts of the positive active material, the conducting agent, the binder, and the solvent may be the same as those levels that are suitably used in lithium batteries. In an implementation, at least one of the conducting agent, the binder, and the solvent may be omitted according to the use and the structure of a lithium battery.

Next, a negative electrode may be prepared.

For example, a negative active material, a conducting agent, a binder, and a solvent may be mixed together to prepare a negative active material composition. In an implementation, the negative active material composition may be directly coated on a metallic current collector and dried to prepare a negative electrode. In an implementation, the negative active material composition may be cast on a separate support to form a negative active material film. In an implementation, the negative active material film may then be separated from the support and laminated on a metallic current collector to prepare a negative electrode.

The negative active material may include a suitable negative active material for a lithium battery. In an implementation, the negative active material may include, e.g., lithium metal, a metal that is alloyable with lithium, a transition metal oxide, a non-transition metal oxide, or a carbonaceous material.

For example, the metal alloyable with lithium may be Si, Sn, Al, Ge, Pb, Bi, Sb, a Si—Y' alloy (where Y' is an alkali metal, an alkali earth metal, a Group XIII element, a Group XIV element, a transition metal, a rare earth element, or a combination thereof, and Y' is not Si), or a Sn—Y" alloy (where Y" is an alkali metal, an alkali earth metal, a Group XIII element, a Group XIV element, a transition metal, a rare earth element, or a combination thereof, and Y" is not Sn). In an implementation, Y' or Y" may be, e.g., Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may include a lithium titanium oxide, a vanadium oxide, a lithium vanadium oxide, or the like.

For example, the non-transition metal oxide may include $SnO_2$, $SiO_x$ (wherein $0<x<2$), or the like.

For example, the carbonaceous material may be crystalline carbon, amorphous carbon, or a mixture thereof. The crystalline carbon may include, e.g., graphite, such as natural graphite or artificial graphite that are in amorphous, plate, flake, spherical, or fibrous form. The amorphous carbon may be soft carbon (sintered at low temperatures), hard carbon, meso-phase pitch carbides, sintered cokes, or the like.

In an implementation, the conducting agent, the binder, and the solvent used in the negative active material composition may be the same as those used in the positive active material composition.

In an implementation, the amounts of the negative active material, the conducting agent, the binder, and the solvent may be the same as those levels that are suitably used in lithium batteries. In an implementation, at least one of the conducting agent, the binder, and the solvent may be omitted according to the use and the structure of a lithium battery.

Next, a separator to be disposed between the positive electrode and the negative electrode may be prepared.

The separator may be a suitable separator used in lithium batteries. In an implementation, the separator may have low resistance to migration of ions in the electrolyte and have good electrolyte-retaining ability. For example, the separator may be selected from glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used in a lithium ion battery. A separator with good organic electrolyte solution-retaining ability may be used in a lithium ion polymer battery. For example, the separator may be manufactured in the following example manner.

In some embodiments, a polymer resin, a filler, and a solvent may be mixed together to prepare a separator composition. The separator composition may be directly coated on an electrode and then dried to form a separator. In some other embodiments, the separator composition may be cast on a support and then dried to form a separator film. The separator film may then be separated from the support and laminated on an electrode to form a separator.

The polymer resin for preparing the separator may be a suitable material used as a binder for electrode plates in the art. For example, the polymer resin may be a vinylidenefluoride/hexafluoropropylene copolymer, polyvinylidene fluoride (PVDF), polyacrylonitrile, polymethylmethacrylate, or a mixture thereof.

Next, an electrolyte according to any of the above-described embodiments may be prepared.

Referring to FIG. 1, a lithium battery 1 according to an embodiment may include a positive electrode 3, a negative electrode 2, and a separator 4. The positive electrode 3, the negative electrode 2, and the separator 4 as described above may be wound, stacked, or folded, and then accommodated in a battery case 5. Subsequently, the electrolyte according to any of the above-described embodiments may be injected into the battery case 5, followed by sealing the battery case 5 with a cap assembly 6, thereby completing the manufacture of the lithium battery 1. The battery case 5 may have a cylindrical, rectangular, pouch, or thin film shape. For example, the lithium battery 1 may be a large-sized thin film-type battery or a lithium ion battery.

In some embodiments, the separator may be disposed between the positive electrode and the negative electrode to form a battery assembly. In some embodiments, the battery assembly may be stacked on another battery assembly to form a bi-cell structure and then impregnated with the electrolyte, followed by placing the resulting structure in a pouch and hermetically sealing the pouch, thereby completing the manufacture of a lithium ion polymer battery.

In some other embodiments, a plurality of such battery assemblies may be stacked upon one another to form a battery pack. The battery pack may be used in any device that requires high capacity and high output, such as a laptop computer, a smart phone, an electric vehicle, or the like.

A lithium battery according to any of the above-described embodiments may exhibit improved lifetime characteristics and high rate characteristics, and thus may be used in, e.g., electric vehicles (EVs). For example, the lithium battery may be used in hybrid vehicles such as plug-in hybrid electric vehicles (PHEV) or the like. The lithium battery may also be used in the fields where storage of a large amount of power is required. For example, the lithium battery may be used in electric bikes, motor-driven tools, and the like.

As used herein, the term "alkyl" may refer to a fully saturated branched or non-branched (straight chain or linear) hydrocarbon.

Non-limiting examples of the "alkyl" include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of the "alkyl" may be substituted with a halogen atom, a C1-C20 alkyl group substituted with a halogen atom (e.g., $CCF_3$, $CHCF_2$, $CH_2F$, $CCl_3$, or the like), a C1-C20 alkoxy group, a C1-C20 alkoxy alkyl group, a hydroxyl group, a nitro group, a cyano group, an amino group, an amidino group, hydrazine, hydrazone, a carboxyl group or a salt thereof, a sulfonyl group, a sulfamoyl group, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen" may refer to fluorine, bromine, chlorine, iodine, and the like.

The term "aryl" may be construed as including a group with an aromatic ring fused to at least one carbocyclic group. Non-limiting examples of the "aryl" group are phenyl, naphthyl, and tetrahydronaphthyl. At least one hydrogen atom of the aryl group may be substituted with any of the substituents as described above with reference to the alkyl group.

As used herein, the term "heteroaryl" group indicates a monocyclic or bicyclic organic compound including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms. Non-limiting examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyridine-2-yl, pyridine-3-yl, 2-pyrazine-2-yl, pyrazine-4-yl, pyrazine-5-yl, 2-pyrimidine-2-yl, 4-pyrimidine-2-yl, or 5-pyrimidin-2-yl.

The term "heteroaryl" indicates a heteroaromatic ring that is fused to at least one of an aryl group, a cycloaliphatic group, and a heterocyclic group.

One or more embodiments of electrolytes and lithium batteries according to the present disclosure will now be described in detail with reference to the following examples. However, these examples are only for illustrative purposes and are not intended to limit the scope of the one or more embodiments of the present disclosure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1: Preparation of Electrolyte

First, an amount sufficient to prepare a 1.15 M $LiPF_6$ (as a lithium salt) solution, about 1 wt % of $LiPO_2F_2$ based on a total weight of electrolyte and about 0.5 wt % of a compound represented by Formula 7 based on a total weight of electrolyte were added to a mixed solvent of ethylene carbonate (EC) and dimethyl carbonate (DMC) (in a volume ratio of about 3:7), and mixed together to prepare an electrolyte. A mixing ratio of $LiPO_2F_2$ to the compound of Formula 7 was about 2:1 by weight.

<Formula 7>

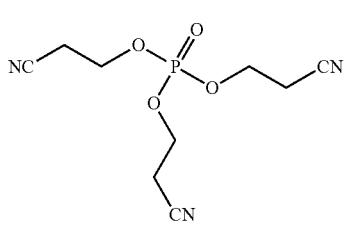

[Formula 6]

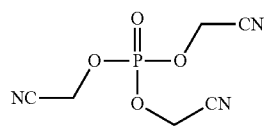

[Formula 8]

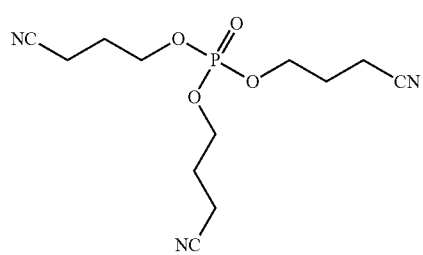

[Formula 9]

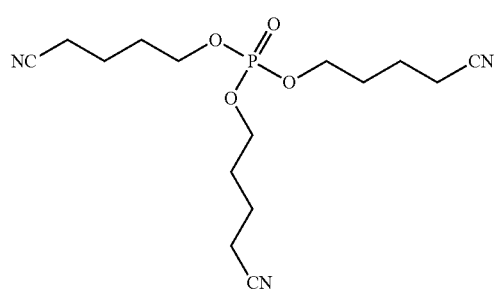

Example 2: Preparation of Electrolyte

An electrolyte was prepared in the same manner as in Example 1, except that about 1 wt % of a compound of Formula 2 was further added. A mixing ratio of LiPO$_2$F$_2$, the compound of Formula 7, and the compound of Formula 2 was about 2:1:2 by weight.

[Formula 2]

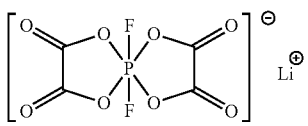

Example 3: Preparation of Electrolyte

An electrolyte was prepared in the same manner as in Example 1, except that about 1.0 wt % of the compound represented by Formula 7, instead of about 0.5 wt % of the compound represented by Formula 7, was used. A mixing ratio of LiPO$_2$F$_2$ to the compound represented by Formula 7 was about 1:1 by weight.

Example 4: Preparation of Electrolyte

An electrolyte was prepared in the same manner as in Example 1, except that about 1.5 wt % of the compound represented by Formula 7, instead of about 0.5 wt % of the compound represented by Formula 7, was used. A mixing ratio of LiPO$_2$F$_2$ to the compound represented by Formula 7 was about 1:1.5 by weight.

Example 5: Preparation of Electrolyte

An electrolyte was prepared in the same manner as in Example 1, except that about 2.0 wt % of the compound represented by Formula 7, instead of about 0.5 wt % of the compound represented by Formula 7, was used. A mixing ratio of LiPO$_2$F$_2$ to the compound represented by Formula 7 was about 1:2 by weight.

Examples 6 to 10: Preparation of Electrolyte

Electrolyte were prepared in the same manner as in Example 1, except that a compound represented by Formula 6, a compound represented by Formula 8, a compound represented by Formula 9, a compound represented by Formula 10, and a compound represented by Formula 11 were used, instead of the compound represented by Formula 7, respectively.

[Formula 10]

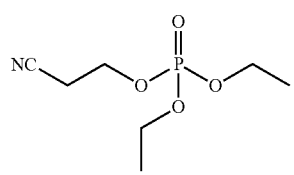

[Formula 11]

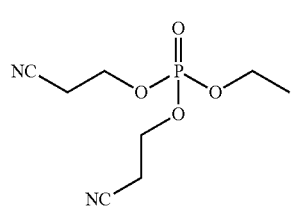

Comparative Example 1: Preparation of Electrolyte

An electrolyte was prepared in the same manner as in Example 1, except that LiPO$_2$F$_2$ and the compound represented by Formula 7 were not added.

Comparative Example 2: Preparation of Electrolyte

An electrolyte was prepared by adding an amount sufficient to prepare a 1.15 M LiPF$_6$ (as a lithium salt) solution, and about 1 wt % of propane sultone (PS) based on a total weight of the electrolyte to a mixed solvent of ethylene carbonate (EC) and dimethyl carbonate (DMC) (in a ratio of about 3:7 by volume), and mixing the resulting mixture.

Comparative Example 3: Preparation of Electrolyte

An electrolyte was prepared in the same manner as in Comparative Example 2, except that about 1.0 wt % of a compound represented by Formula 2 was further added.

Manufacturing Example 1: Manufacture of Lithium Battery

First, a negative electrode was manufactured as follows.

After about 97 wt % of graphite particles (MC20, available from Mitsubishi Chemical), about 1.5 wt % of a conducting agent (BM408, available from Daicel), and about 1.5 wt % of a binder (BM400-B, available from Zeon) were mixed together, distilled water was added to the mixture and then stirred with a mechanical stirrer for about 60 minutes to prepare a negative active material slurry. The negative active material slurry was coated on a copper (Cu) current collector having a thickness of about 10 μm to a thickness of about 60 μm with a doctor blade, dried in a hot-air dryer at about 100° C. for 0.5 hours, and further dried under vacuum at about 120° C. for about 4 hours, followed by roll pressing to thereby manufacture a negative electrode. The negative electrode had a mixed density of about 1.55 g/cc and a loading level (L/L) of about 14.36 mg/cm$^2$.

A positive electrode was manufactured according to the following processes.

After about 94 wt % of $LiNi_{0.6}Co_{0.2}Mn_{0.2}O_2$ (NCM 622, available from Samsung SDI), about 3.0 wt % of a conducting agent (Denka black), and about 3.0 wt % of a binder (PVDF, Solef 6020, available from Solvay) were mixed together, the mixture was added to N-methylpyrrolidone as a solvent, and stirred with a mechanical stirrer for about 30 minutes to prepare a positive active material slurry. The positive active material slurry was coated on an aluminum (Al) current collector having a thickness of about 20 μm to a thickness of about 60 μm with a doctor blade, dried in a hot-air dryer at about 100° C. for 0.5 hours, and further dried under vacuum at about 120° C. for about 4 hours, followed by roll pressing to thereby manufacture a positive electrode. The positive electrode had a mixed density of about 3.15 g/cc and a loading level (L/L) of about 27.05 mg/cm$^2$.

The negative and positive electrodes were assembled together with a polyethylene separator (having a thickness of about 16 μm, available from SK Innovation) and the electrolyte of Example 1, thereby manufacturing a lithium battery (about 40 mAh pouch cell).

Manufacturing Examples 2 to 5

Lithium batteries were manufactured in the same manner as in Manufacturing Example 1, except that the electrolytes of Examples 2 to 5 were used, instead of the electrolyte of Example 1, respectively.

Manufacturing Example 6: Manufacture of Lithium Battery

A lithium battery was manufactured in the same manner as in Manufacturing Example 1, except that $LiNi_{0.88}Co_{0.1}Al_{0.02}O_2$, instead of $LiNi_{0.6}Co_{0.2}Mn_{0.2}O_2$, was used to manufacture the positive electrode.

Manufacturing Example 7: Manufacture of Lithium Battery

A lithium battery was manufactured in the same manner as in Manufacturing Example 1, except that $LiNi_{0.33}Co_{0.33}Mn_{0.33}O_2$, instead of $LiNi_{0.6}Co_{0.2}Mn_{0.2}O_2$, was used to manufacture the positive electrode.

Manufacturing Examples 8 to 12: Manufacture of Lithium Battery

Lithium batteries were manufactured in the same manner as in Manufacturing Example 1, except that the electrolytes of Examples 6 to 10 were used, instead of the electrolyte of Example 1, respectively.

Comparative Manufacturing Examples 1 to 3: Manufacture of Lithium Battery

Lithium batteries were manufactured in the same manner as in Manufacturing Example 1, except that the electrolytes of Comparative Examples 1 to 3 were used, instead of the electrolyte of Example 1, respectively.

Evaluation Example 1: Electrochemical Stability (Evaluation of Positive Electrode by Linear Sweep Voltammetry (LSV))

Figure 2:
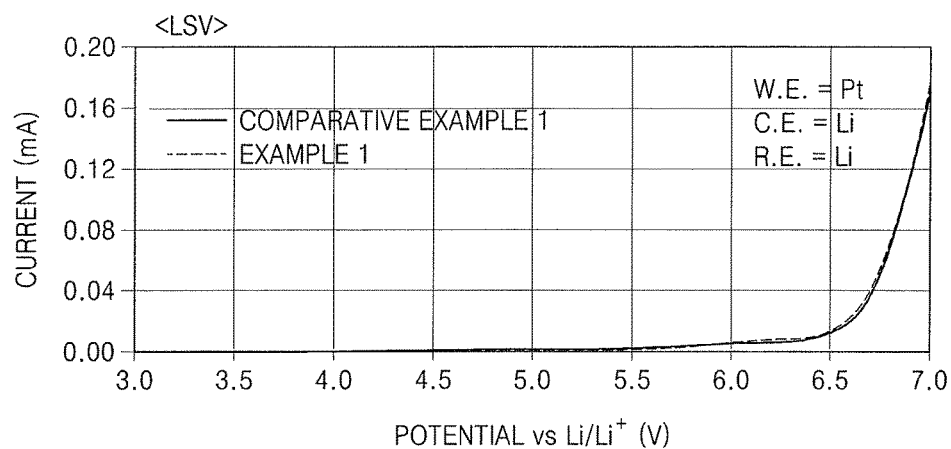
FIG. 2 illustrates a linear sweep voltammetry (LSV) graph of positive electrode with respect to electrolytes of Example 1 and Comparative Example 1.

Electrochemical stabilities of a positive electrode with regard to the electrolytes of Example 1 and Comparative Example 1 were evaluated by LSV in the following manner. First, for the LSV evaluation of a positive electrode, three-electrode battery systems were manufactured using a platinum (Pt) electrode as a working electrode (W.E.), lithium metal as a counter electrode (C.E.), and lithium metal as a reference electrode (R.E.), wherein the electrolyte of Example 1 and Comparative Example 1 was inserted into the three-electrode battery systems, respectively. The electrochemical stability evaluation by LSV was performed in a voltage range up to about 6 V at a scan rate of about 5 mV/s. FIG. 2 illustrates a graph showing the results of the LSV evaluation of the positive electrodes.

Referring to FIG. 2, no specific decomposition of the positive electrode by the electrolyte of Example 1, compared to the electrolyte of Comparative Example 1, was observed, indicating that the compound of Formula 7 may be used as a stable electrolyte additive compatible with the positive electrode.

Evaluation Example 2: Electrochemical Stability (Evaluation of Negative Electrode by Cyclic Voltammetry (CV))

Electrochemical stabilities of a negative electrode with regard to the electrolytes of Example 1 and Comparative Example 1 were evaluated by CV in the following manner. First, for the CV evaluation of a negative electrode, three-electrode battery systems were manufactured using graphite as a working electrode (W.E.), lithium metal as a counter electrode (C.E.), and lithium metal as a reference electrode (R.E.), wherein the electrolyte of Example 1 and Comparative Example 1 were inserted into the three-electrode battery systems, respectively. The electrochemical stability evaluation by CV was performed in a voltage range up to about 6 V at a scan rate of about 5 mV/s. The results are shown in FIG. 3

Figure 3:
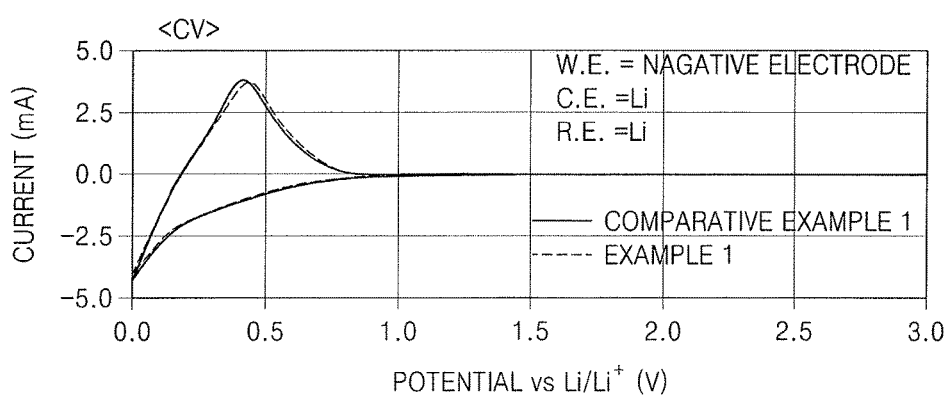
FIG. 3 illustrates a cyclic voltammetry (CV) graph of negative electrode with respect to the electrolytes of Example 1 and Comparative Example 1.

Referring to FIG. 3, no specific decomposition of the negative electrode by the electrolyte of Example 1, compared to the electrolyte of Comparative Example 1, was observed, indicating that the compound of Formula 7 may be used as a stable electrolyte additive compatible with the negative electrode.

Evaluation Example 3: Charge and Discharge Characteristics at High Voltage (4.3 V) and Room Temperature (25° C.)

1) Manufacturing Example 1 and Comparative Manufacturing Examples 1 and 2

Each of the lithium batteries of Manufacturing Example 1 and Comparative Manufacturing Examples 1 and 2 was charged at about 25° C. with a constant current of 0.1 Coulomb (C) rate to a voltage of about 4.30 Volts (V) (with respect to Li), and then with a constant voltage of 4.30 V until a cutoff current of 0.05 C rate, and was then discharged with a constant current of 0.1 C rate to a voltage of about 2.8 V (with respect to Li) (Formation process, $1^{st}$ cycle).

Each of the lithium batteries after the $1^{st}$ cycle of formation process was charged at about 25° C. with a constant current of 0.1 C to a voltage of about 4.20 V (with respect to Li) and then with a constant voltage of 4.20 V until a cutoff current of 0.05 C rate, and was then discharged with a constant current of 0.2 C rate to a voltage of about 3.0 V (with respect to Li) (Formation process, $2^{nd}$ cycle). After the formation process, each of the lithium batteries was charged at about 25° C. with a constant current of 0.1 C to a voltage of about 4.20 V (with respect to Li) and then with a constant voltage of 4.20V until a cutoff current of 0.05 C rate, and was then discharged with a constant current of 0.1 C rate to a voltage of about 3.0 V (with respect to Li). This cycle was then repeated to the $200^{th}$ cycle.

A rest period for about 20 minutes was allowed after each cycle throughout the entire charging and discharging process. Some results from the charge and discharge test are shown in FIG. 4.

Figure 4:
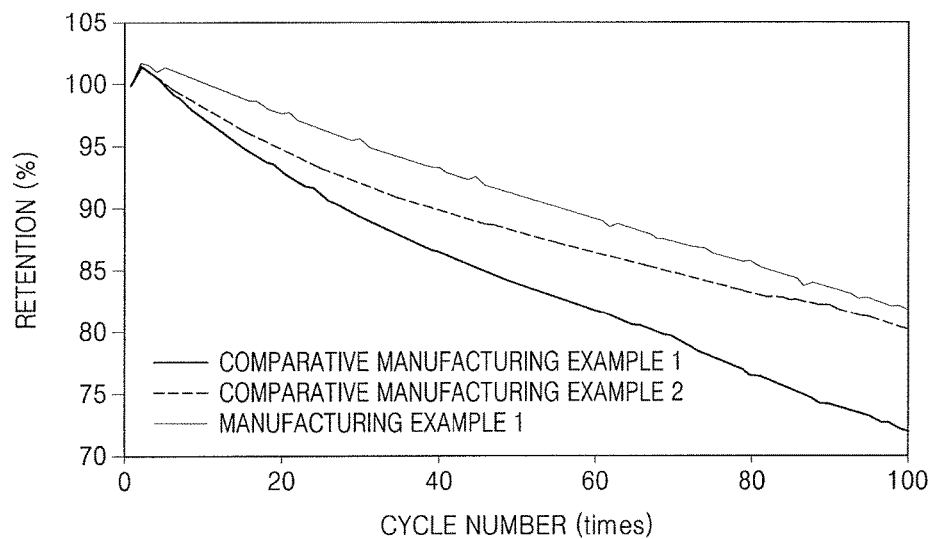
FIG. 4 illustrates a graph illustrating charge and discharge characteristics at high voltage (4.3 V) and room temperature (25° C.) of lithium batteries of Manufacturing Example 1 and Comparative Manufacturing Examples 1 and 2.

Referring to FIG. 4, the lithium battery of Manufacturing Example 1 was found to have significantly improved lifetime characteristics at room (e.g., ambient) temperature, compared to the lithium batteries of Comparative Manufacturing Examples 1 and 2.

2) Manufacturing Example 6 and Comparative Manufacturing Example 1-2

Charge and discharge characteristics at room temperature of the lithium batteries of Manufacturing Example 6 and Comparative Manufacturing Examples 1 and 2 were evaluated in the same manner as above to the lithium batteries of Manufacturing Example 1 and Comparative Manufacturing Examples 1 and 2. The results are shown in FIG. 5.

Figure 5:
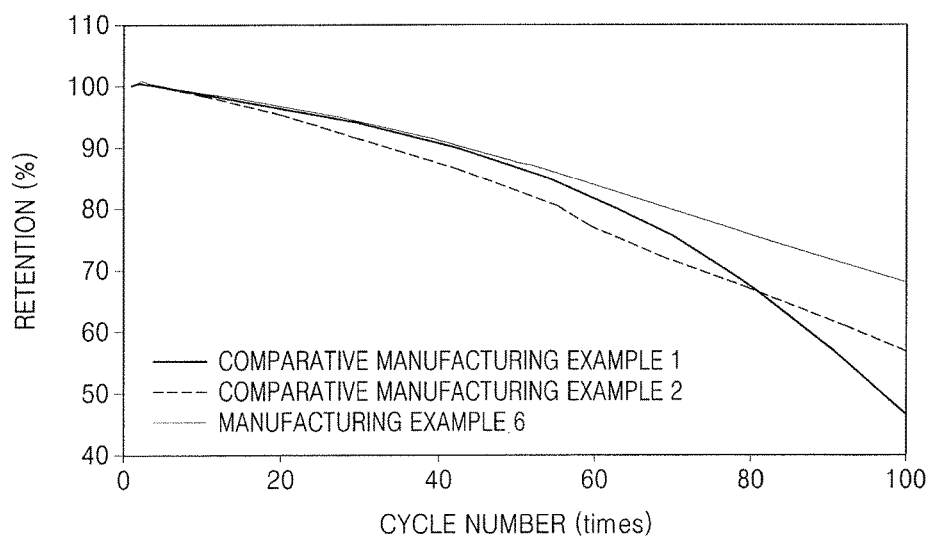
FIG. 5 illustrates a graph illustrating charge and discharge characteristics at room temperature of a lithium battery of Manufacturing Example 1 and lithium batteries of Comparative Manufacturing Examples 1 to 2.

Referring to FIG. 5, the lithium battery of Manufacturing Example 6 was found to have improved charge and discharge characteristics at room temperature, compared to those of the lithium batteries of Comparative Manufacturing Examples 1 and 2.

3) Manufacturing Example 7 and Comparative Manufacturing Example 1-2

Charge and discharge characteristics at room temperature of the lithium batteries of Manufacturing Example 7 and Comparative Manufacturing Examples 1 and 2 were evaluated in the same manner as above to the lithium batteries of Manufacturing Example 1 and Comparative Manufacturing Examples 1 and 2. The results are shown in FIG. 6.

Figure 6:
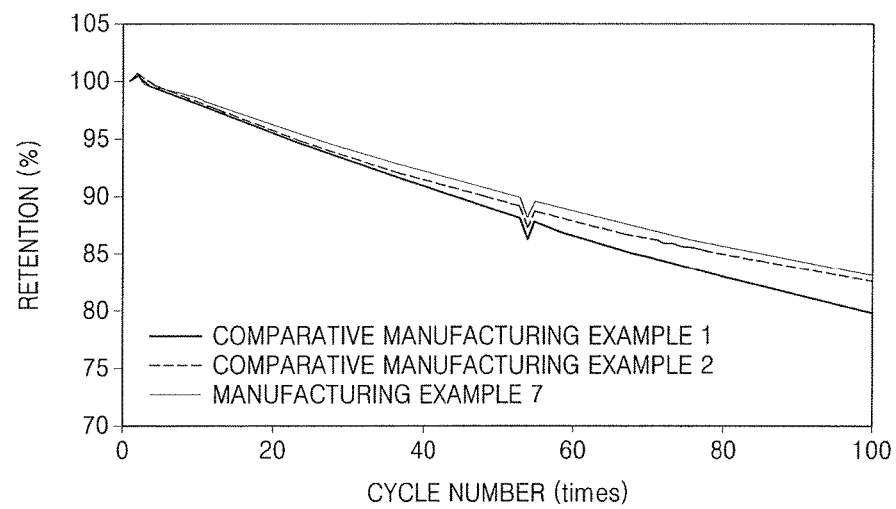
FIG. 6 illustrates a graph illustrating charge and discharge characteristics at room temperature of lithium batteries of Manufacturing Example 7 and Comparative Manufacturing Examples 1 and 2.

Referring to FIG. 6, the lithium battery of Manufacturing Example 7 was found to have improved charge and discharge characteristics at room temperature, compared to those of the lithium batteries of Comparative Manufacturing Examples 1 and 2.

4) Manufacturing Example 2 and Comparative Manufacturing Examples 1 and 3

Charge and discharge characteristics at room temperature of the lithium batteries of Manufacturing Example 2 and Comparative Manufacturing Examples 1 and 3 were evaluated in the same manner as above to the lithium batteries of Manufacturing Example 1 and Comparative Manufacturing Examples 1 and 2. The results are shown in FIG. 7.

Figure 7:
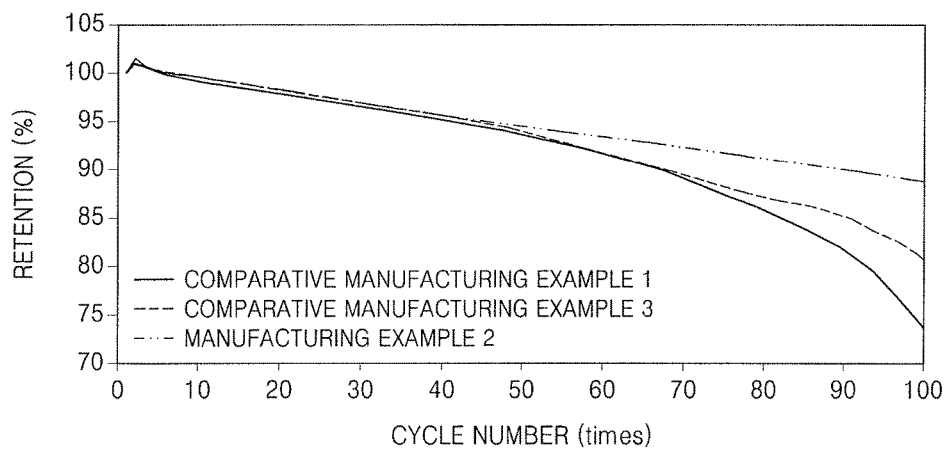
FIG. 7 illustrates a graph illustrating charge and discharge characteristics at room temperature of lithium batteries of Manufacturing Example 2 and Comparative Manufacturing Examples 1 and 3.

Referring to FIG. 7, the lithium battery of Manufacturing Example 2 was found to have improved charge and discharge characteristics at room temperature, compared to those of the lithium batteries of Comparative Manufacturing Examples 1 and 3.

5) Manufacturing Example 1 and 3 to 5, and Comparative Manufacturing Example 1

Charge and discharge characteristics at room temperature of the lithium batteries of Manufacturing Examples 1, 3, 4, and 5, and Comparative Manufacturing Example 1 were evaluated in the same manner as above to the lithium batteries of Manufacturing Example 1 and Comparative Manufacturing Examples 1 and 2. The results are shown in FIG. 8.

Figure 8:
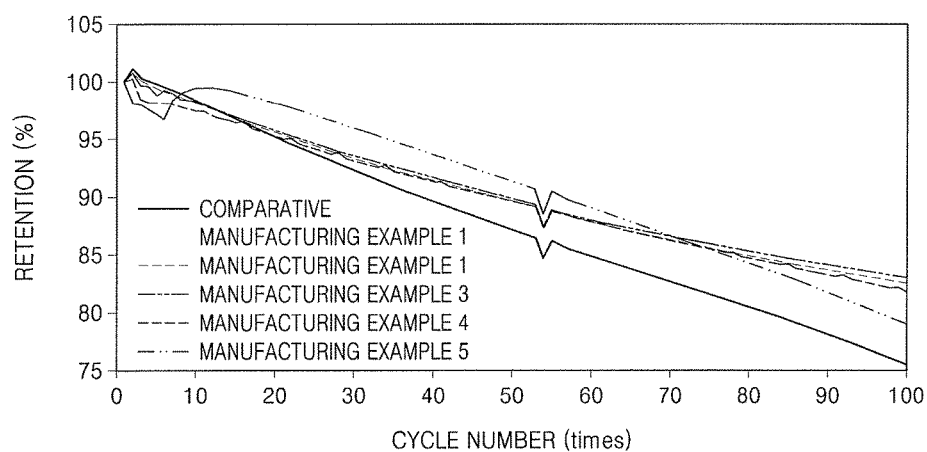
FIG. 8 illustrates a graph illustrating charge and discharge characteristics at room temperature (25° C.) of lithium batteries of Manufacturing Examples 1, 3, 4, and 5 and Comparative Manufacturing Example 1.

Referring to FIG. 8, the lithium batteries of Manufacturing Examples 1, 3, 4, and 5 were found to have improved charge and discharge characteristics at room temperature, compared to those of the lithium battery of Comparative Manufacturing Example 1.

Charge and discharge characteristics at room temperature of the lithium batteries of Manufacturing Examples 8 to 12 were evaluated in the same manner as above to the lithium batteries of Manufacturing Example 1.

As a result of the evaluation, the lithium batteries of Manufacturing Examples 8 to 12 were found to have similar charge and discharge characteristics at room temperature to those of the lithium battery of Manufacturing Example 1.

Evaluation Example 4: Charge and Discharge Characteristics at High Voltage (4.3 V) and High Temperature (45° C.)

1) Manufacturing Example 6 and Comparative Manufacturing Examples 1 and 2

Each of the lithium batteries of Manufacturing Example 6 and Comparative Manufacturing Examples 1 and 2 was charged at about 25° C. with a constant current of 0.1 Coulomb (C) rate to a voltage of about 4.30 Volts (V) (with respect to Li), and then with a constant voltage of 4.30 V until a cutoff current of 0.05 C rate, and was then discharged with a constant current of 0.1 C rate to a voltage of about 2.8 V (with respect to Li) (Formation process, $1^{st}$ cycle).

Each of the lithium batteries after the $1^{st}$ cycle of formation process was charged at about 25° C. with a constant current of 0.1 C to a voltage of about 4.20 V (with respect to Li) and then with a constant voltage of 4.20 V until a cutoff current of 0.05 C rate, and was then discharged with a constant current of 0.2 C rate to a voltage of about 3.0 V (with respect to Li) (Formation process, $2^{nd}$ cycle). After the formation process, each of the lithium batteries was charged at about 45° C. with a constant current of 0.1 C to a voltage of about 4.20 V (with respect to Li) and then with a constant voltage of 4.20 V until a cutoff current of 0.05 C rate, and was then discharged with a constant current of 0.1 C rate to a voltage of about 3.0 V (with respect to Li). This cycle was then repeated to the 200th cycle.

A rest period for about 20 minutes was allowed after each cycle throughout the entire charging and discharging process. Some results from the charge and discharge test are shown in FIG. 9.

Figure 9:
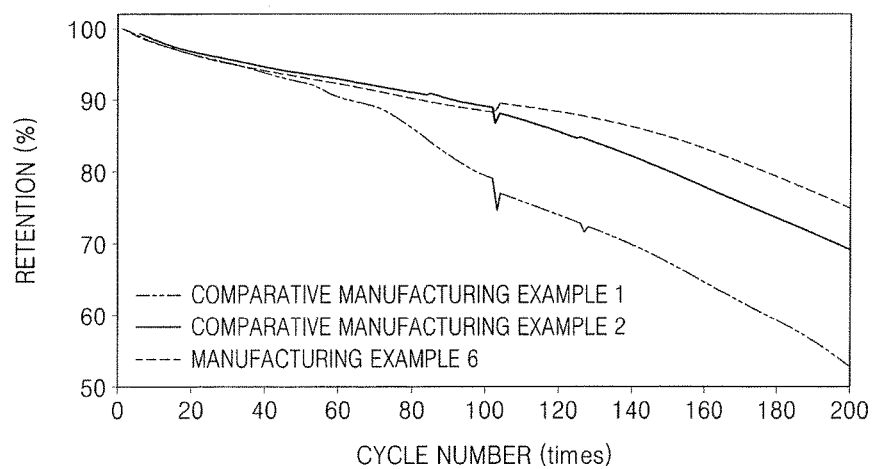
FIG. 9 illustrates a graph illustrating charge and discharge characteristics at high temperature (45° C.) of the lithium batteries of Manufacturing Example 6 and Comparative Manufacturing Examples 1 and 2.

Referring to FIG. 9, the lithium battery of Manufacturing Example 6 was found to have significantly improved lifetime characteristics at high temperature, compared to the lithium batteries of Comparative Manufacturing Examples 1 and 2.

Charge and discharge characteristics at high temperature of the lithium batteries of Manufacturing Examples 8 to 12 were evaluated in the same manner as those of the lithium battery of Manufacturing Example 6 described above.

As a result of the evaluation, the lithium batteries of Manufacturing Examples 8 to 12 were found to have similar charge and discharge characteristics at high temperature as those of the lithium battery of Manufacturing Example 6.

Evaluation Example 5: Thickness Evaluation after Storage at High Temperature (60° C.)

Manufacturing Example 1 and Comparative Manufacturing Examples 1 and 2

Each of the lithium batteries of Manufacturing Example 1 and Comparative Manufacturing Examples 1 and 2 was charged at about 25° C. with a constant current of 0.1 Coulomb (C) rate to a voltage of about 4.30 Volts (V) (with respect to Li), and then with a constant voltage of 4.30 V until a cutoff current of 0.05 C rate, and was then discharged with a constant current of 0.1 C rate to a voltage of about 2.8 V (with respect to Li) (Formation process, $1^{st}$ cycle).

Each of the lithium batteries after the $1^{st}$ cycle of formation process was charged at about 25° C. with a constant current of 0.1 C to a voltage of about 4.20 V (with respect to Li) and then with a constant voltage of 4.20 V until a cutoff current of 0.05 C rate, and was then discharged with a constant current of 0.2 C rate to a voltage of about 3.0 V (with respect to Li) (Formation process, $2^{nd}$ cycle).

After the formation process, each of the lithium batteries was charged at about 25° C. with a constant current of 0.1 C to a voltage of about 4.30 V (with respect to Li) and then with a constant voltage of 4.30 V until a cutoff current of 0.05 C rate, so that the lithium battery reached a 100% state of charge (SOC) fully charged with a voltage of 4.3 V.

Each of the lithium batteries after the above-described processes was stored in a 60° C. oven (high temperature) for 10 days and 30 days, and then subjected to a thickness measurement. The results of the battery thickness measurement are shown in FIG. 10.

Figure 10:
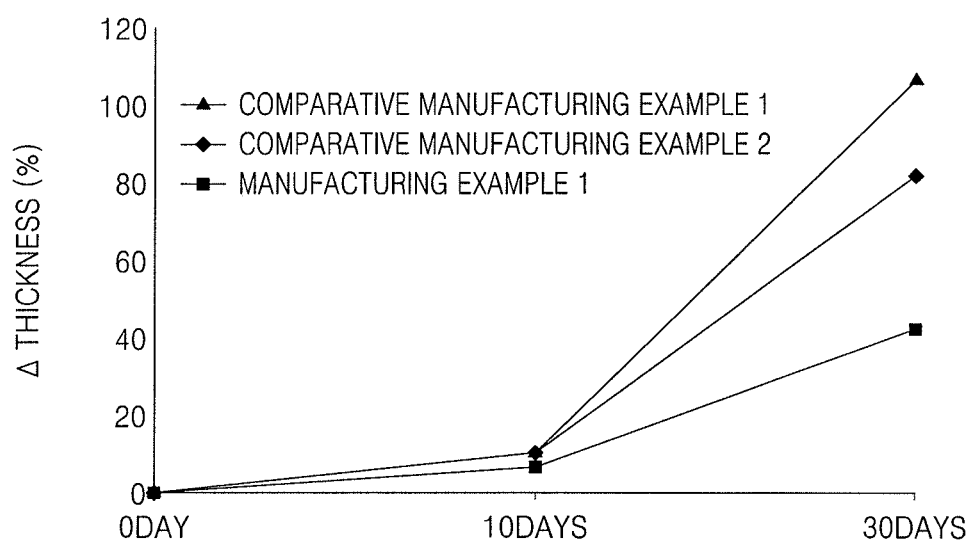
FIG. 10 illustrates a graph illustrating thickness characteristics of the lithium batteries of Manufacturing Example 1 and Comparative Manufacturing Examples 1 and 2 after storage at high temperature (60° C.).

Referring to FIG. 10, the lithium battery of Manufacturing Example 1 was found to have less increase in thickness after the storage at high temperature, compared to the lithium batteries of Comparative Manufacturing Examples 1 and 2, indicating that the lithium battery of Manufacturing Example 1 may have improved swelling characteristics.

By way of summation and review, lithium batteries may operate at high operating voltages, and thus, an aqueous electrolyte solution that is highly reactive to lithium may not be used. An organic electrolyte may be used in lithium batteries. The organic electrolyte may be prepared by dissolving a lithium salt in an organic solvent.

As an additive for the electrolyte, a sultone-based compound such as propane sultone may be used in order to help enhance the lifespan of a lithium battery. However, when a sultone-based compound is used, a satisfactory lifespan may not be achieved at room temperature.

The embodiments may provide an electrolyte for a lithium battery, the electrolyte having improved lifetime characteristics at room temperature and high temperature.

As described above, according to the one or more embodiments, a lithium battery with improved lifetime characteristics at high temperature and room temperature and suppressed increase in cell resistance may be manufactured using an electrolyte according to any of the above-described embodiments.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrolyte for a lithium battery, the electrolyte comprising:

$LiPO_2F_2$, and a compound represented by one of the following Formulae 6 to 11:

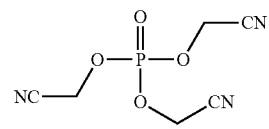

[Formula 6]

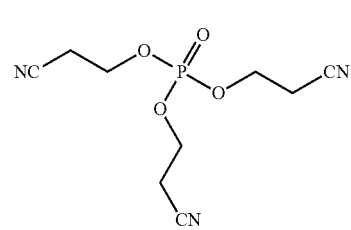

[Formula 7]

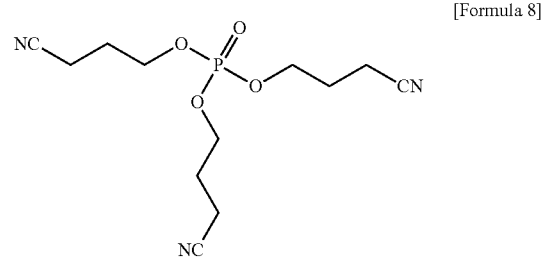

[Formula 8]

[Formula 9]

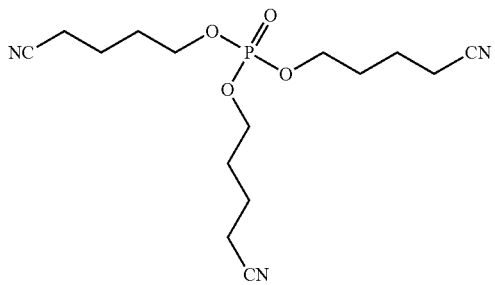

[Formula 10]

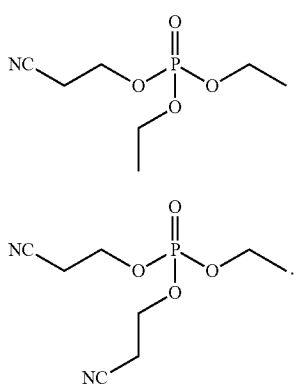

[Formula 11]

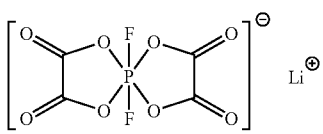

2. The electrolyte as claimed in claim 1, further comprising a compound represented by Formula 2:

[Formula 2]

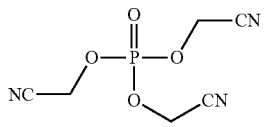

3. The electrolyte as claimed in claim 1, wherein the compound represented by one of Formulae 6 to 11 is included in the electrolyte in an amount of about 0.1 wt % to about 10 wt %, based on a total weight of the electrolyte.

4. A lithium battery, comprising:
a positive electrode;
a negative electrode; and
an electrolyte, the electrolyte including $LiPO_2F_2$ and a compound represented by one of the following Formulae 6 to 11,

[Formula 6]

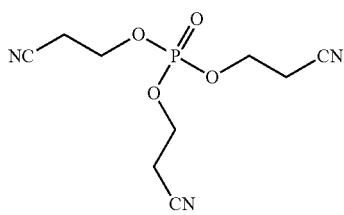

[Formula 7]

[Formula 8]

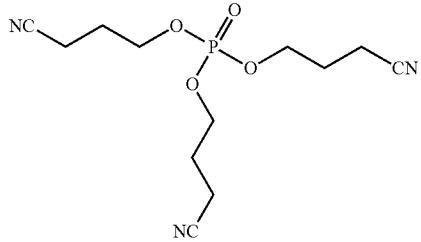

[Formula 9]

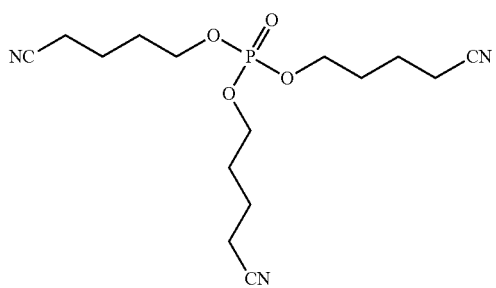

[Formula 10]

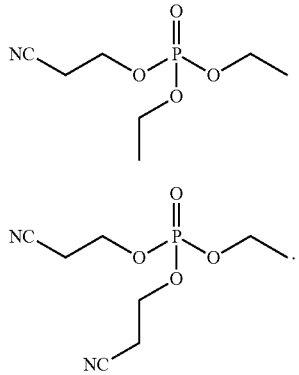

[Formula 11]

5. The lithium battery as claimed in claim 4, wherein the positive electrode includes a lithium-nickel composite compound.

6. The lithium battery as claimed in claim 5, wherein the lithium-nickel composite compound is represented by Formula 12:

$$Li_xNi_yM_{1-y}O_2 \qquad \text{<Formula 12>}$$

wherein, in Formula 12, x is from about 0.9 to about 1.2; y is from about 0.5 to about 1.0; and M is cobalt (Co), manganese (Mn), and/or aluminum (Al).

7. The lithium battery as claimed in claim 6, wherein the compound represented by Formula 12 is represented by the following Formula 13 or Formula 14:

$$Li_xNi_yCo_zMn_{1-y-z}O_2 \qquad \text{[Formula 13]}$$

wherein, in Formula 13, $1 \leq x \leq 1.2$, $0.5 \leq y < 1$, $0 \leq z \leq 0.5$, and $0 \leq 1-y-z \leq 0.5$; and $$Li_xNi_yCo_zAl_{1-y-z}O_2 \qquad \text{[Formula 14]}$$

wherein, in Formula 14, $1 \leq x \leq 1.2$, $0.5 \leq y \leq 1$, and $0 \leq z \leq 0.5$.

8. The lithium battery as claimed in claim 6, wherein the compound represented by Formula 12 is $LiNi_{0.6}Co_{0.2}Mn_{0.2}O_2$ or $LiNi_{0.88}Co_{0.1}Al_{0.02}O_2$.

9. The lithium battery as claimed in claim 4, wherein:
the electrolyte includes an organic solvent; and
the organic solvent includes a linear or cyclic carbonate, a linear or cyclic ester, a linear or cyclic amide, an aliphatic nitrile, or a linear or cyclic ether.

10. The lithium battery as claimed in claim 4, wherein the electrolyte further includes a lithium salt.

11. The lithium battery as claimed in claim 4, wherein the electrolyte further includes a compound represented by Formula 2:

[Formula 2]

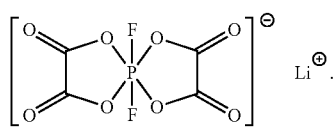

12. The lithium battery as claimed in claim 4, wherein the compound represented by one of Formulae 6 to 11 is included in the electrolyte in an amount of about 0.1 wt % to about 10 wt %, based on a total weight of the electrolyte.

13. A lithium battery, comprising:
a positive electrode that includes $LiNi_{0.6}Co_{0.2}Mn_{0.2}O_2$ or $LiNi_{0.88}Co_{0.1}Al_{0.02}O_2$;
a negative electrode; and
an electrolyte, the electrolyte including a compound represented by Formula 1 and $LiPO_2F_2$,

[Formula 1]

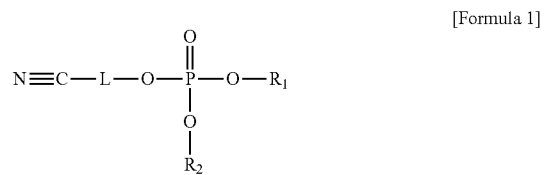

wherein, in Formula 1,
$R_1$ and $R_2$ are each independently a substituted or unsubstituted C1-C10 alkyl group or -$L_1$-CN; and
L and $L_1$ are each independently a substituted or unsubstituted C1-C5 alkylene group, a substituted or unsubstituted C6-C10 arylene group, or a substituted or unsubstituted C3-C20 heteroarylene group.

* * * * *